3,138,600
BIS(TETRAHYDROISOQUINOLYL)ALKANES

Otis E. Fancher and Shin Hayao, Elkhart, Ind., assignors to Miles Laboratories, Inc., Elkhart, Ind., a corporation of Indiana
No Drawing. Filed May 25, 1959, Ser. No. 815,295
1 Claim. (Cl. 260—286)

This invention relates to new compositions of matter and to a process for their preparation. Particularly, the invention relates to bis(tetrahydroisoquinolyl)alkanes and halogen salts having amebicidal and trypanocidal activity.

The novel compositions of this invention conform to the following general formula:

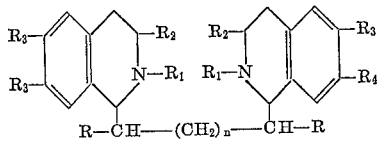

In the formula above, R represents alkyl groups having from 2 to 6 carbon atoms, $R_1$ and $R_2$ represent hydrogen or alkyl groups having from 1 to 4 carbon atoms, $R_3$ and $R_4$ represent alkoxy groups having from 1 to 4 carbon atoms or alkylenedioxy groups having from 1 to 3 carbon atoms, and $n$ represents an integer of from 4 to 10, inclusive.

While the values for the substituent radicals given above are operable values, in the preferred compositions of this invention R stands for alkyl groups containing from 2 to 5 carbon atoms, $R_1$ and $R_2$ stand for hydrogen or methyl groups, $R_3$ and $R_4$ stand for methoxy or methylenedioxy groups.

In addition, the class of bis(tetrahydroisoquinolyl)alkanes of the above formula is limited to those compounds whose α,ω-disubstituted alkylene bridge does not contain less than 12, and preferably not less than 14, carbon atoms. Thus, when the R substituent has a lower carbon content, the value of $n$ is correspondingly higher, and vice versa.

The bis(tetrahydroisoquinolyl)alkanes of this invention, as defined above, have been found to be extremely useful as amebicidal and trypanocidal compositions, particularly, in the form of hydrohalide salts. Although the dihydrochlorides of the compounds are preferably used against amoeba or trypanosomes, other salts such as the hydroiodides or hydrobromides may be used.

PROCEDURE

The compounds of the invention are prepared by a procedure which comprises the following steps:

1. *Preparation of the dicarboxamide.*—A mixture of 2 moles of a primary amine and one mole of a dicarboxylic acid are heated in a nitrogen atmosphere at about 190–200° C. for from 1–40 hours, depending upon the rate of reaction as influenced by the size of the alkyl substituents of the dicarboxylic acid, the reaction rate being slowed by increase in size of the alkyl groups. This reaction product, a dark melt, is the corresponding dicarboxamide.

Instead of the dicarboxylic acid, the corresponding acid chloride may be used. In this instance 1 mole of the primary amine in 20% NaOH is treated with an ether solution of ½ mole of the dicarboxylic acid chloride at 0° C. The dicarboxamide immediately separates.

2. *Preparation of the bis(dihydroisoquinolyl)alkane.*—After treating the dicarboxamide by appropriate purification procedures, including trituration with solvent and recrystallization to give a material having the proper analysis, one mole of the dicarboxamide is heated to reflux with 1 liter of phosphoryl chloride for from 1–2 hours. The excess phosphoryl chloride is removed under vacuum and the residual bis(3,4-dihydroisoquinolyl)alkane is purified by appropriate procedures.

3. *Preparation of the bis(tetrahydroisoquinolyl)alkane.*—The purified bis(dihydroisoquinolyl)alkane is hydrogenated in the presence of a hydrogenation catalyst to give the desired bis(tetrahydroisoquinolyl)alkane, which is isolated and characterized as the appropriate salt.

This compound may be further alkylated by well-known procedures to give N-alkyl derivatives. For example, the bis(tetrahydroisoquinolyl)alkane prepared as described above may be treated with formaldehyde and formic acid to give the N-methyl derivative.

N-alkyl derivatives may also be obtained by quaternization of the bis(dihydroisoquinolyl)alkane by treatment with the appropriate alkyl halide followed by catalytic hydrogenation.

A large number of compounds representative of the compounds of this invention were prepared following the general procedure steps as detailed above. To more specifically illustrate this procedure, there is set out below a detailed example of the preparation of a compound in accordance with the formula given above wherein R is n-butyl, $R_1$ is hydrogen, $R_2$ is methyl, $R_3$ and $R_4$ are methoxy, and $n$ is 5.

Example

1. *Preparation of the dicarboxamide.*—A mixture of 10 g. (0.033 mole) of 5,11-pentadecanedicarboxylic acid and 13 g. (0.067 mole) of alphamethylhomoveratrylamine was heated to 190°–200° C. for 5 hours and then cooled to room temperature. There resulted a dark brown solid mass. Trituration with ether gave a tan powder which melted at 114°–115° C. *Anal.*—Calcd. for $C_{39}H_{62}N_2O_6$: N, 4.28. Found: N, 4.21. This compound was N,N'-bis(alpha - methylhomoveratryl) - 5,11 - pentadecanedicarboxamide.

When the acid chloride was used, the procedure for the preparation of the dicarboxamide was as follows:

The diacid chloride was prepared from 15 g. (0.05 mole) of 5,11-pentadecanedicarboxylic acid (solid isomer) and 30 ml. of thionyl chloride refluxed in solution for 3 hours. Excess thionyl chloride was removed in vacuo (water pump) and the remaining syrup dissolved in 100 ml. of ether. It was added to a well-stirred mixture of 16.5 g. (0.1 mole) of homopiperonylamine and 50 ml. of 20% sodium hydroxide solution at 0° during 10 minutes to give an immediate separation of a white solid. It was stirred at room temperature for an hour and the solid was collected by suction, washed with water, ether, and then with water. The product was dried at 50–60° C. in an oven overnight; yield 27.3 g. (89%), M.P. 160–164° (softening at 156°), UV max. 236.5, 390.5 mμ (log E, 3.92, 3.88).

A sample was recrystallized twice from aqueous methanol to give a white powder of M.P. 163–165° C. (softening at 159.5). *Anal.*—Calcd. for $C_{35}H_{50}N_2O_6$: N, 4.71. Found: N, 4.81.

2. *Preparation of the bis(dihydroisoquinolyl)alkane.*—The N,N'-bis(alpha-methylhomoveratryl)-5,11-pentadecanedicarboxamide (6.99) was heated under gentle reflux with 30 ml. of $POCl_3$ for 30 minutes to give a dark red liquid. The excess $POCl_3$ was removed by distillation under reduced pressure. The remaining dark syrup was treated with ice water to give a gray syrup. The free base was extracted with benzene and the benzene solution extracted with dilute hydrochloric acid. The acid extract was treated with carbon, filtered, cooled, and made alkaline with ammonia to give a colorless oil. This oil was extracted with ether, dried, and treated with dry hydrochloric acid to give a pale yellow syrup.

3. *Preparation of the Bis(tetrahydroisoquinolyl)alkane.*—This yellow syrup was dissolved in 100 ml. of methanol and hydrogenated at 40 lb. pressure using 0.3 g. of platinum oxide as catalyst. The catalyst was filtered off, the methanol solvent evaporated, and the residue was dissolved in water and made alkaline with ammonia to give a white syrup. This syrup was extracted with ether, dried over magnesium sulfate, and treated with dry hydrogen chloride. The syrupy dihydrochloride was dried over $P_2O_5$ in a vacuum dessicator to give the desired final product in the form of a fine colorless powder, melting at 95°–100° C. *Anal.*—Calcd. for $C_{39}H_{64}Cl_2N_2O_4$: N, 4.03. Found: N, 3.84.

The preparation of the N-methyl derivative by the use of the formaldehyde-formic acid procedure is as follows:

3,8-bis(3-methyl-6,7-dimethoxy - 1,2,3,4 - tetrahydro-1-isoquinolyl)decane dihydrochloride (23 g., 0.037 mole) was dissolved in 250 ml. of hot water, cooled and made basic with aqueous potassium carbonate to give a white gum which was extracted with ether and dried over anhydrous magnesium sulfate. The solvent was removed and the residue was dissolved in 17 g. (0.38 mole) of formic acid (98–100%) and then 13.5 ml. (0.168 mole) of 36% formaldehyde was added.

The resulting solution was heated on a steam bath for seven hours. It was made acidic with 15% hydrochloric acid and evaporated to dryness in vacuo at 100° C. to give a brown syrup. The purification was repeated twice as follows:

The syrup was dissolved in water, treated with Norit, made basic with aqueous sodium carbonate and the resulting syrup was extracted with ether. Finally, the ethereal solution was added to ether, saturated with dry hydrogen chloride to give a syrup which was washed with ether and taken up in isopropanol. The alcoholic solution was evaporated to dryness in vacuo and the residue was further dried over $P_2O_5$ under high vacuum. The hygroscopic powder weighed 19.0 g.; M.P. ca. 165°. *Anal.*—Calcd. for $C_{36}H_{58}Cl_2N_2O_4$: N, 4.28. Found: N, 4.09.

As was stated above, quaternization of the dihydroisoquinoline with an alkyl halide followed by catalytic hydrogenation also results in N-alkyl derivatives. This reaction proceeds as follows:

N,N′ - (homopiperonyl) - 5,11 - pentadecanedicarboxamide (27.3 g., 0.046 mole) was dissolved in 100 ml. of hot phosphoryl chloride and the clear pale yellow solution was refluxed for 2 hours to give a greenish-yellow solution. Excess phosphoryl chloride was removed at a water pump. The remaining syrup was added to ca. 100 ml. of methanol to give a clear solution which was made basic with conc. ammonium hydroxide. The resulting syrupy free base was taken up in ether and dried over anhydrous magnesium sulfate.

The solvent was removed at a water pump to leave a syrup to which was added 50 ml. of methyl iodide. The clear yellowish-orange solution was refluxed for an hour to give a deep yellow pasty mixture. Excess methyl iodide was removed in vacuo at 100° C. to give a bright yellow solid mass; yield 35.8 g. (92.5%); M.P. 168–170° C. (d.) after two recrystallizations from isopropanol. *Anal.*—Calcd. for $C_{37}H_{52}N_2O_4$: N, 3.33. Found: N, 3.21; UV max. 223, 254, 310, 373, m$\mu$ (log E, 4.52, 4.36, 4.05, 4.16) in methanol.

5,11 - bis(6,7-methylenedioxy-1,2,3,4-tetrahydro-1-isoquinolyl)-pentadecane dihydroiodide.—The dimethiodide (14 g., 0.017 mole) was dissolved in 200 ml. of methanol and hydrogenated with 0.3 g. of Adams' catalyst. It took up the calculated amount of hydrogen in 20 hours. The filtrate was evaporated to dryness in vacuo at 100° to give a pale pink solid, yield 13.0 g., M.P. ca. 120° C. with foaming (softening began at 108° C.). It was dissolved in hot isopropanol and then evaporated to dryness in vacuo at 100° C. to give a pale pink crystalline solid; yield, 11.7 g., M.P. 135–140° C. (after drying at 140° C. in vacuo). *Anal.*—Calcd. for $C_{37}H_{58}I_2N_2O_4$: N, 3.31. Found: N, 3.41 UV max. 222.5, 296 m$\mu$ (log E, 4.46, 3.92) in methanol.

As was stated above, the compounds within the purview of this invention have amebicidal and trypanocidal activity.

The amebicidal activity was tested in accordance with the procedure prescribed by the National Institutes of Health and involves the determination of the concentration of the compounds in gamma per milliliter which is sufficient to kill a unit quantity of *Endamoeba histolytica* which is carried on Locke's Whole Egg Media (WEL).

The trypanocidal activities of the compounds were determined by the procedure described in an article by Bradner and Rawson titled "An in Vitro Method of Screening Amebicidal Agents Using the Phillips Culture," appearing in Science, 113, 674 (1951). This activity is reported as the concentration of the compound in gamma per milliliter required to kill a unit quantity of *Trypanosoma cruzi* carried on a medium prescribed by the National Institutes of Health.

In addition, the toxicity of the compounds were determined interperitoneally in mice and orally in rats.

Physical data, toxicity data, and amebicidal and trypanocidal activity of 9 compounds which are representative of the novel compositions of matter are set out in Table I below. Included in the table are data on three compounds (Nos. 10–12) which are different in that R represents hydrogen atoms, i.e., they contain non-substituted straight-chain alkylene bridges, and three compounds (Nos. 13–15) which differ from the inventive compounds in that the total carbon content of their di-substituted alkylene bridge is less than $C_{12}$.

TABLE I

[Physical and Pharmacological Data on Bis(Tetrahydroisoquinolyl)Alkanes]

| No. | MA No. | R | $R_1$ | $R_2$ | $R_3$ | $R_4$ | n | M.P., °C. | Yield, percent | $LD_{50}$ Mouse (IP) | $LD_{50}$ Rat (Oral) | E. histol. Activity | T. cruzi Activity |
|---|---|---|---|---|---|---|---|---|---|---|---|---|---|
| 1 | 446 | $nC_4H_9$ | H | $CH_3$ | $CH_3O$ | $CH_3O$ | 5 | 160–180 | 55.0 | | 2,828 | 50 | 50 |
| 2 | 477 | $nC_4H_9$ | H | $CH_3$ | $CH_3O$ | $CH_3O$ | 6 | 170 | 77.5 | 255 | 2,480 | 100 | 100 |
| 3 | 455 | $nC_4H_9$ | H | H | $CH_3O$ | $CH_3O$ | 5 | 210 | 91.5 | 120 | 1,445 | 50 | 50 |
| 4 | 461 | $nC_4H_9$ | H | $CH_3$ | $-O-CH_2-O-$ | | 4 | 275–278 | 12.0 | 413 | 624 | 100 | 10 |
| 5 | 514 | $nC_4H_9$ | $CH_3$ | H | $-O-CH_2-O-$ | | 5 | 135–140 | 92.5 | | | 1,000 | 100 |
| 6 | 505 | $C_2H_5$ | H | H | $CH_3O$ | $CH_3O$ | 10 | 150 | 76.0 | | 1,655 | 50 | 100 |
| 7 | 502 | $C_2H_5$ | H | H | $-O-CH_2-O-$ | $CH_3O$ | 10 | 254–255 | 25.5 | 490 | 3,040 | 100 | 1,000 |
| 8 | 456 | $C_5H_{11}$ | H | H | $CH_3O$ | $CH_3O$ | 5 | 265–266 | 75.0 | 1,212 | 1,500 | 50 | 50 |
| 9 | 487 | $C_5H_{11}$ | H | $CH_3$ | $CH_3O$ | $CH_3O$ | 5 | 150–170 | 55.0 | 145 | 3,040 | 50 | 100 |
| 10 | 459 | H | H | H | $-O-CH_2-O-$ | | 5 | 255 | 52.5 | 117 | 1,525 | 500 | 500 |
| 11 | 454 | H | H | $CH_3$ | $CH_3O$ | $CH_3O$ | 2 | 270 | | | | 1,000 | 1,000 |
| 12 | 475 | H | H | $CH_3$ | $CH_3O$ | $CH_3O$ | 5 | 255 | 88.2 | 490 | 735 | 1,000 | 1,000 |
| 13 | 452 | $C_2H_5$ | H | H | $CH_3O$ | $CH_3O$ | 4 | 240–243 | 78.5 | 203 | 864 | 500 | 1,000 |
| 14 | 447 | $C_2H_5$ | H | $CH_3$ | $CH_3O$ | $CH_3O$ | 4 | 170 | 97.0 | 120 | 491 | 1,000 | 1,000 |
| 15 | 449 | $C_2H_5$ | $CH_3$ | $CH_3$ | $CH_3O$ | $CH_3O$ | 4 | 165 | 79.0 | 50 | 64 | 1,000 | 500 |

The data in Table I above demonstrate the utility of the compounds of this invention. Upon examination, it will be noted that Compounds 1 through 9 are highly active against amoebae and/or trypanosomes, while Compounds 10 through 15 are considerably less effective or ineffective.

The latter compounds as regards their chemical constitution lack either dialkyl substitutions at both points of attachment to the tetrahydroisoquinolyl radicals (Compounds 10-12) or a total carbon content in excess of $C_{12}$ of the disubstituted alkylene bridge (Compounds 13-15), which are structural characteristics of the active compounds and dual requisites for amebicidal action. There is thus a nexus between chemical constitution and physiological properties.

In addition, it has been found that the compounds claimed herein also exhibit unexpected and superior amebicidal and/or trypanocidal properties over certain closely related compounds, disclosed in Osbond et al., Journ. Chem. Soc., pp. 4785-92 (1952). These prior art compounds have a mono(lower)alkyl substitution in the middle of a short alkylene bridge, but as emphasized and demonstrated above, excellent amebicidal activity is imparted to the compounds disclosed herein by a dual requisite of chemical constitution: carbon content of $>C_{12}$ and disubstitution of the alkylene bridge.

More specifically, upon comparison of 1-(6,7-dimethoxy - 1,2,3,4 - tetrahydro - 1 - isoquinolyl) - 2 - (1,2,3,4 - tetrahydro - 6,7 - dimethoxy - 1 - isoquinolylmethyl) butane, a compound of the Osbond reference, and 5,11-bis(6,7 - dimethoxy - 1,2,3,4 - tetrahydro - 1 - isoquinolyl)pentadecane, Compound No. 3 of the table, with emetine hydrochloride as standard of comparison, which is active within 48 hours at 1:100,000 to 1:400,000 dilution, it was found, in duplicate in vitro tests, that the Osbond compound did not fall within the emetine range of activity, while Compound No. 3 fell within the amebicidal range of emetine. By present criteria the Osbond compound can therefore not be considered as amebicidal.

These comparative results establish that the compounds, claimed herein, possess unexpected and superior antimicrobial properties over the structurally closest prior art compounds.

To summarize briefly, this invention relates to novel compositions of matter which have outstanding and unexpected amebicidal and trypanocidal activity. The compounds may be generally described as bis(tetrahydroisoquinolyl)alkanes and the hydrohalide salts thereof. A representative compound is 5,11-bis(6,7-dimethoxy-3-methyl - 1,2,3,4 - tetrahydro - 1 - isoquinolyl)pentadecane dihydrochloride.

The compositions conform to the generic formula:

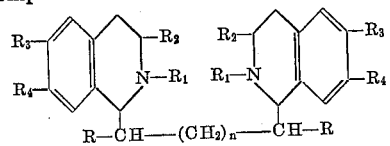

wherein R is an alkyl group of from 2 to 6, preferably 2 to 5 carbon atoms; wherein $R_1$ and $R_2$ are selected from the group consisting of hydrogen atoms and alkyl groups of from 1 to 4 carbon atoms, preferably methyl groups; wherein $R_3$ and $R_4$ are selected from the group consisting of alkoxy groups of from 1 to 4 carbon atoms, preferably methoxy groups, and alkylenedioxy groups of preferably methoxy groups, and alkylenedioxy groups of from 1 to 3 carbon atoms, preferably methylenedioxy groups; wherein $n$ is an integer from 4 to 10; and wherein the total carbon content of the $\alpha,\omega$-disubstituted alkylene bridge is not less than $C_{12}$.

This application is a continuation-in-part to our application, Serial No. 670,888, filed July 10, 1957, now abandoned.

What is claimed is:

5,11 - bis(6,7 - methylenedioxy - 1,2,3,4 - tetrahydro-1-isoquinolyl)-pentadecane dihydrochloride.

References Cited in the file of this patent
UNITED STATES PATENTS 2,659,728  Craig et al. _____ Nov. 17, 1953
2,744,901  Nabenhauer _____ May 8, 1956

OTHER REFERENCES

Osbond et al., Jour. Chem. Soc., 1952, pp. 4785-92.
Fancher et al., J. Amer. Chem. Soc., vol. 80, pp. 1451-6 (1958).